United States Patent [19]
Jacques

[11] Patent Number: 6,041,931
[45] Date of Patent: Mar. 28, 2000

[54] LIDDED CONTAINER FOR LOBSTERS OR LIKE CRUSTACEAN

[75] Inventor: Michel Jacques, St-Damien, Canada

[73] Assignee: IPL Inc., Quebec, Canada

[21] Appl. No.: 09/294,498

[22] Filed: Apr. 20, 1999

[51] Int. Cl.[7] .......................... B65D 21/00; B65D 25/00; A01K 61/00; F25D 3/08

[52] U.S. Cl. .......................... 206/505; 62/371; 119/214; 206/508; 220/560; 220/676; 220/826; 220/DIG. 6; 220/DIG. 15

[58] Field of Search ................................. 220/4.28, 359.1, 220/359.2, 359.3, 359.4, 592.01, 592.03, 607, 676, 608, DIG. 15, 826; 206/508; 62/371; 119/204, 214; 249/121, 203, 204

[56] References Cited

U.S. PATENT DOCUMENTS

| | | |
|---|---|---|
| 2,535,493 | 12/1950 | Gerber .......................... 220/DIG. 15 |
| 3,376,046 | 4/1968 | Kivett et al. .......................... 206/508 X |
| 3,595,425 | 7/1971 | Eicholtz .......................... 220/367.1 X |
| 4,989,744 | 2/1991 | Tominaga .......................... 220/367.1 X |
| 5,328,048 | 7/1994 | Stein .......................... 220/826 |
| 5,540,901 | 7/1996 | Riley .......................... 220/676 X |
| 5,555,845 | 9/1996 | Flynn .......................... 119/214 |
| 5,632,405 | 5/1997 | McMath . |
| 5,727,709 | 3/1998 | Nobile .......................... 220/560 |

Primary Examiner—Gary E. Elkins
Assistant Examiner—Rodrigo L Eichwald
Attorney, Agent, or Firm—Merchant & Gould P.C.

[57] ABSTRACT

A lidded container for lobsters or like crustacean comprises a container formed of plastics material having sidewalls, endwalls and a bottom wall and a lid formed of plastics material which is adapted to be hingedly secured to the container sidewalls to move between an open position and a close position. The lid has a top wall formed of a series of upwardly projecting ribs defining wells to receive and retain therein ice which, when melted, passes through perforations in the bottom faces of the wells to circulate about the lobsters. The water then exits through apertures in the sidewalls, endwalls and bottom wall of the container.

9 Claims, 5 Drawing Sheets

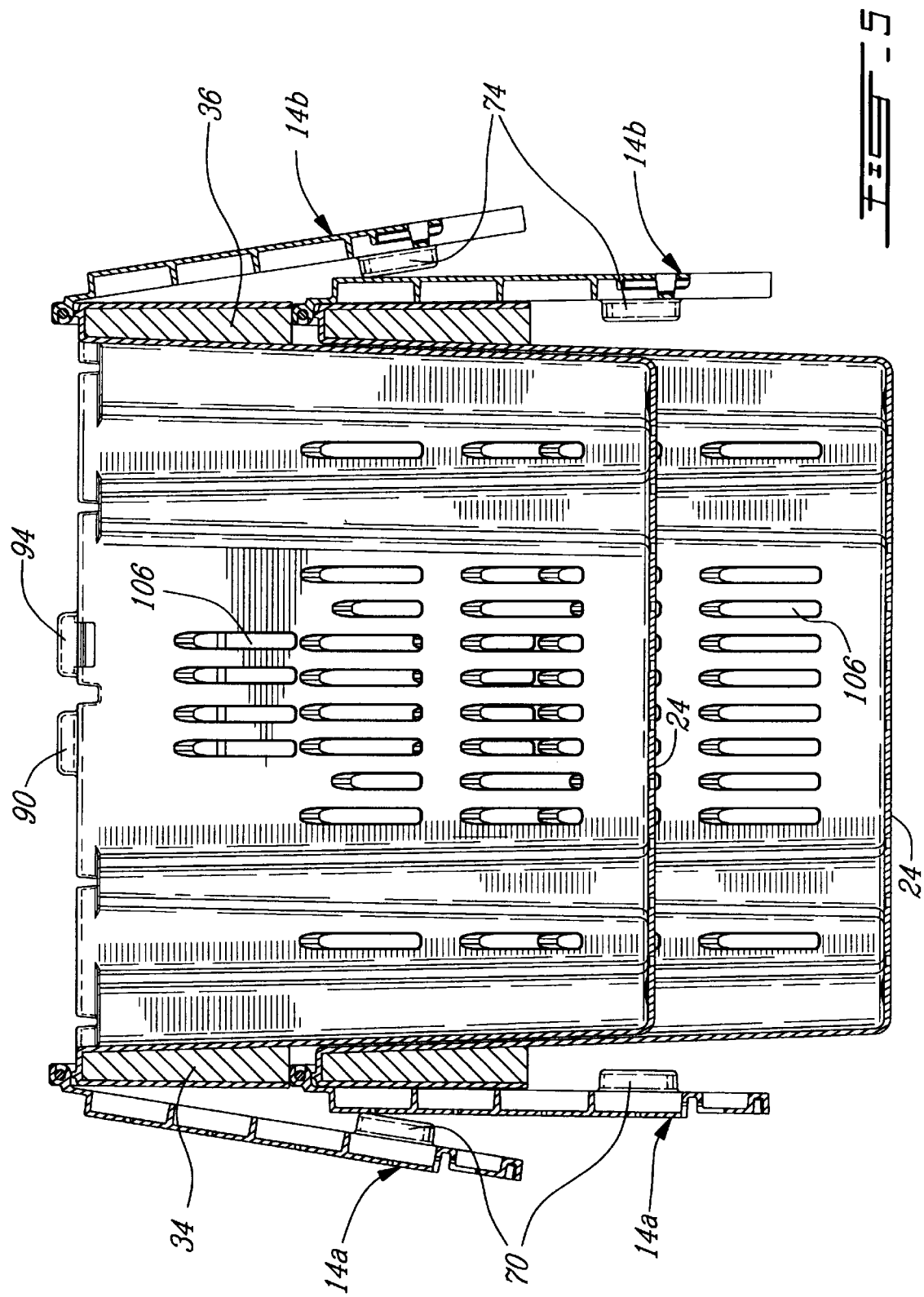

LIDDED CONTAINER FOR LOBSTERS OR LIKE CRUSTACEAN

FIELD OF THE INVENTION

The present invention relates to a lidded container formed of plastics material and adapted to contain live lobsters or crustacean which need be maintained under cooled conditions.

BACKGROUND OF THE INVENTION

In the field of lobster fishing, boxes for containing live lobsters are conventionally made of wood so that they may float along the fishing boat or at some storage area with water circulating into and out of the box to keep the lobsters therein alive and fresh.

Containers made of plastic material or synthetic resin material are also noted to have been used in replacement of wood containers which are subject to deterioration.

In other containers such as the one described in U.S. Pat. No. 5,632,405 issued May 27, 1997 to McMath, plastics material and wood have been combined in the making of containers for the purpose of containing lobsters alive.

OBJECTS OF THE INVENTION

It is an object of the present invention to provide a plastic container which is so constructed as to receive and contain ice while allowing water from melting ice to infiltrate the container and circulate about the lobsters so as to maintain them alive and fresh.

It is also an object of the present invention to provide a lidded container made of plastic material which is formed with apertures in its sidewalls, endwalls and bottom wall so that water may exit the container and, in cases where similarly constructed containers are stacked, the water may continue circulation into containers located therebeneath.

It is also an object of the present invention to provide such lidded container made of plastic material which may therefore be stacked when the lids are closed as well as be nested when the lids are opened.

It is a further object of the present invention to provide a lidded container made of plastic material with floatable means so that the container may float along a fishing boat or at a storage area.

The present invention therefore relates to a lidded container for lobsters or like crustacean which comprises:
- a container formed of plastics material having a pair of sidewalls, a pair of end walls and a bottom wall; the sidewalls, endwalls and bottom wall having water passing apertures therein;
- lid means formed of plastics material adapted to be hingedly secured to the container sidewalls to move between an open position and a close position; the lid having a top wall formed of a series of upwardly projecting ribs defining wells to receive and retain therein ice; the wells having a bottom face with perforations therein to allow melted ice water in the wells to infiltrate the container, circulate about lobsters or like crustacean in the container and exit through the apertures in the container walls.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF THE DRAWINGS

FIG. 5 is a cross sectional view showing two lidded containers made in accordance with the present invention in nested formation.

DESCRIPTION OF PREFERRED EMBODIMENTS

Figure 1:
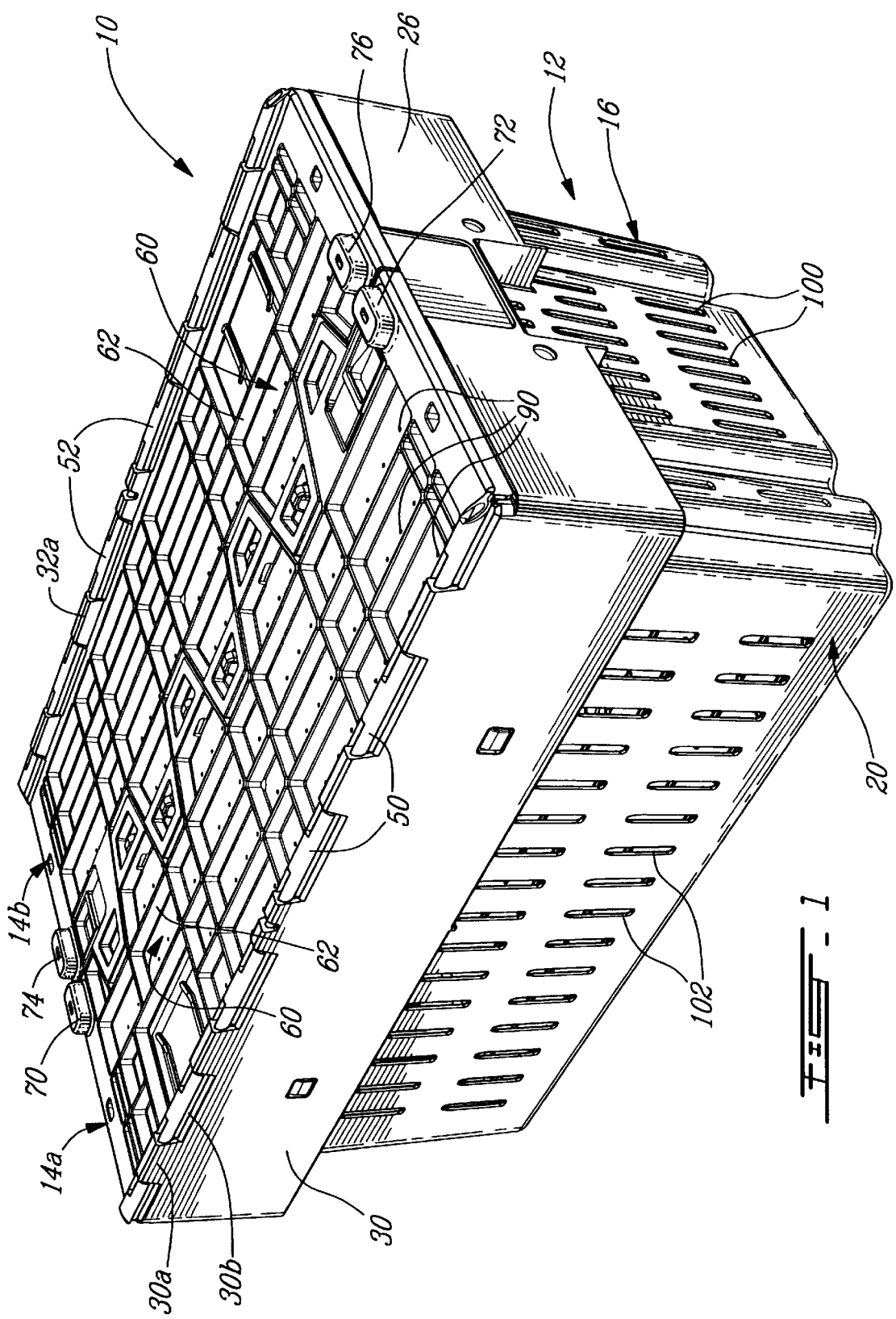
FIG. 1 is a top perspective view of a lidded container for lobsters or like crustacean made in accordance with the present invention.

Referring to FIG. 1, there is shown a lidded container, generally denoted 10, for lobsters or like crustacean made in accordance with the present invention. It is formed of a plastic container 12 and of a plastic lid 14 which, in the present case, consists of two similarly shaped lid sections 14a and 14b.

Figure 2:
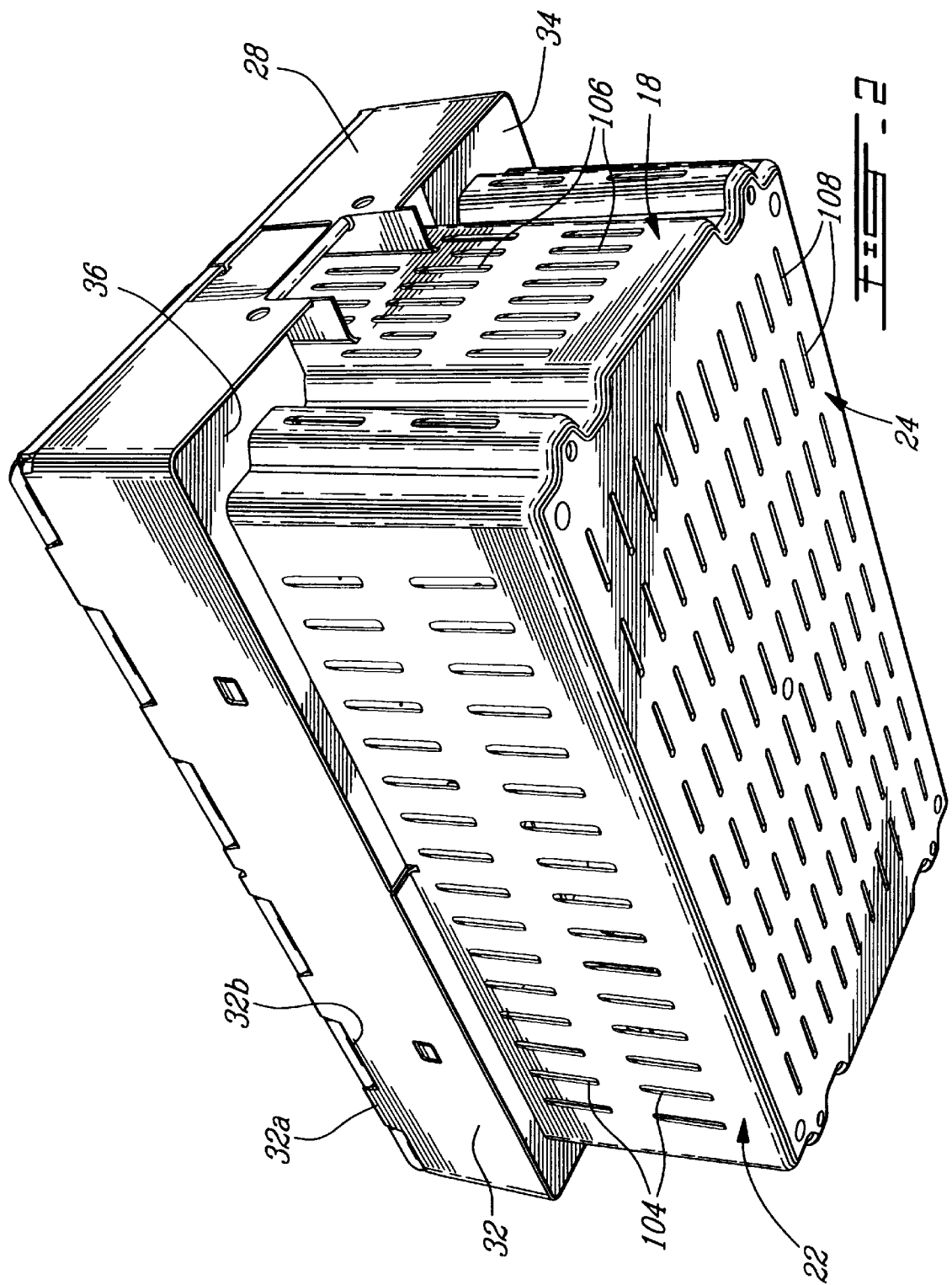
FIG. 2 is a bottom perspective view of the lidded container once rotated 180°.

Referring together with FIG. 2 (which is a 180° rotated view of the container of FIG. 1), the container comprises a pair of endwalls 16 and 18 and a pair of sidewalls 20 and 22, the endwalls and the sidewalls being integrally formed with a bottom wall 24.

Respective endwalls and the sidewalls each have at their upper parts a downwardly extending skirt 26, 28, 30, 32 which is somewhat distanced from their associated endwall or sidewall so that a pair of foam-like blocks 34 and 36 may be fixedly secured therein to provide buoyancy to the container. Alternatively, floatation of the container could also be achieved by forming under the skirt portions enclosed air chambers formed of walls integrally formed with the container sidewalls and endwalls.

Figure 4:
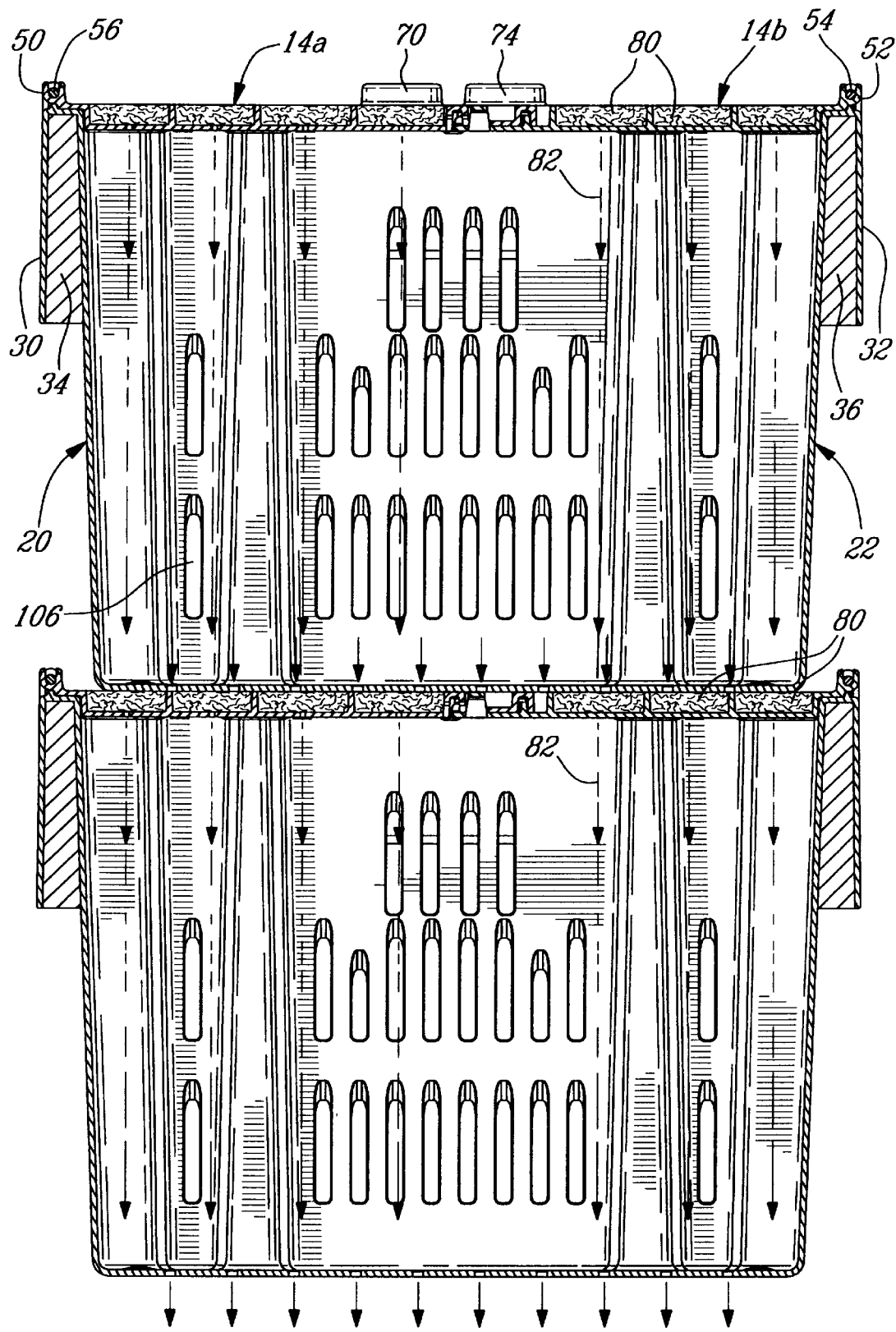
FIG. 4 is a cross sectional view taken along lines 4—4 of FIG. 3 showing two lidded containers made in accordance with the present invention in stacked formation.

The upper edges of the skirts 30 and 32 have a hinge configuration formed of projecting parts 30a, 32a and recessed areas 30b, 32b. Referring to FIG. 4, the lid sections 14a and 14b have a series of C-shaped hook extensions 50, 52 at their outer edge that engage rods 54, 56 extending through the recessed areas 30b, 32b.

As illustrated in FIG. 1, the lid sections 14a and 14b have a top wall which displays a pattern of rectangular wells 60 defined by a series of upwardly projecting ribs 62. Preferably, the upper edges of the ribs 62 all extend in a common plane so as to form a co-planar supporting base whenever a similarly constructed lidded container is stacked on the closed lid container. Similarly, the plane of the upper edges of the ribs extend somewhat lower than a plane extending through the opposite hinge structures of the container so that a portion of the bottom part of a superposed container is securely confined in place and prevented from sideways displacement. To ensure a similar endwise function of the container, each lid section 14a, 14b includes a pair of upwardly projecting stoppers 70, 72 and 74 and 76 respectively.

Figure 3:
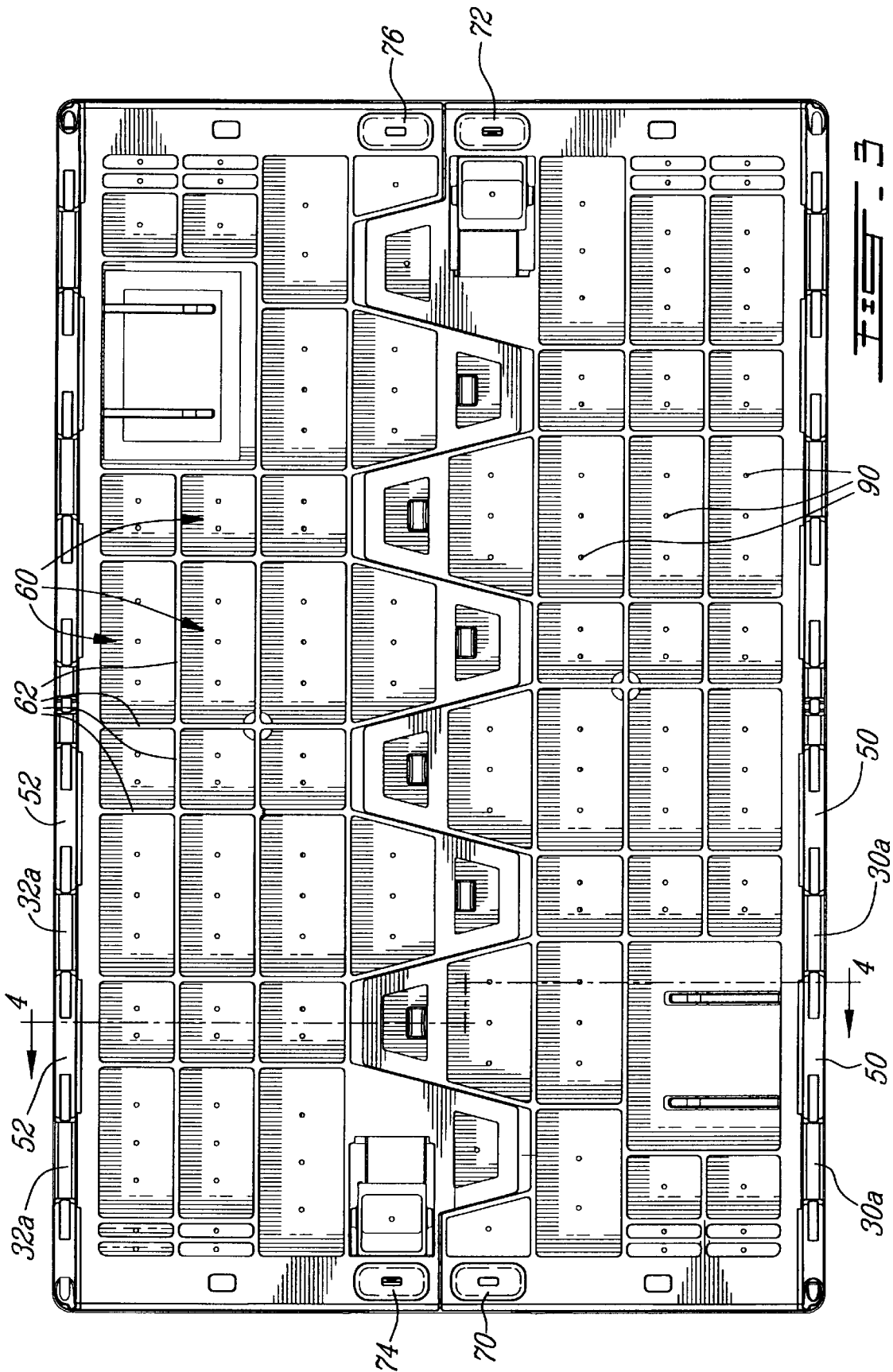
FIG. 3 is a top plan view of the lidded container.

The presence of wells on the top wall of the lidded container serves to receive chipped ice 80. As can be seen in FIGS. 1 and 3, a series of perforations 90 are provided in each well so that, once the ice melts, the cold water will infiltrate the container, contact the lobsters or like crustacean to keep them alive and fresh. The endwalls, sidewalls and bottom walls of the container comprises a series of apertures or slots 100, 102, 104, 106 and 108 allowing the cooling water to exit the container after having contacted the lobsters and, in cases where containers are stacked, to infiltrate a lower disposed container. The dimensions of these slots is such as to prevent claws or other parts of the lobsters from extending outside the container where they can be broken off.

In a preferred form of the invention, the apertures on the sidewalls, endwalls and bottom wall of the container should be between about 0.25 to 0.40 inch so as to prevent the lobster claws from exiting therethrough. On the other hand, the perforations of the wells should be of a dimension as to prevent ice from entering the container, for example between about 0.100 and 0.300 mm.

Referring to FIG. 4, two stacked containers are shown with ice 80 received in the wells, arrows 82 indicating that water resulting from ice melting is allowed to pass through the containers.

The sidewalls and endwalls of the container are slightly tapered so that when they are nested such as illustrated in FIG. 5, they are received one within the other with their lid sections outwardly extending in the open position. The upper edges of the endwalls have a pair of projections (two of which are illustrated as 90 and 94) which are so dimensioned as to be covered by the stoppers 70, 72, 74, 76 of the lid sections when the latter are folded over the container.

Although the invention has been described above with respect with one specific form, it will be evident to a person skilled in the art that it may be modified and refined in various ways. It is therefore wished to have it understood that the present invention should not be limited in scope, except by the terms of the following claims.

I claim:

1. A lidded container for lobsters and other crustacean comprising:

a container formed of plastics material having a pair of sidewalls, a pair of end walls and a bottom wall; said sidewalls, endwalls and bottom wall having water passing apertures therein;

a lid formed of plastics material adapted to be hingedly secured to the container sidewalls to move between an open position and a close position; said lid having a top wall formed of a series of upwardly projecting ribs defining wells to receive and retain therein ice; said wells having a bottom face with perforations therein to allow melted ice water in said wells to infiltrate said container, circulate about lobsters and other crustacean in said container and exit through said apertures in said container walls.

2. A lidded container as defined in claim 1, wherein said ribs consist of projections integrally formed of said top wall; said projections each having a top edge extending in a common plane.

3. A lidded container as defined in claim 2, wherein said lid means consist of two lid sections each having an outer side edge thereof hingedly connected to an upper edge of said sidewalls.

4. A lidded container as defined in claim 3, wherein said sidewalls of said container and said outer side edges of said lid sections define opposite elongated hinge areas having a height exceeding that of said common plane of said projections so as to receive the bottom wall of a superposed container for stacking.

5. A lidded container as defined in claim 4, further comprising integral stopper means on opposite ends of said lid sections cooperating with said hinge areas for preventing stacked containers to slide relative to one another when stacked.

6. A lidded container as defined in claim 1, wherein said sidewalls of said container are slightly tapered allowing said container with said lids in said open position to be nested with an identically constructed container.

7. A lidded container as defined in claim 1, wherein said apertures define elongated slots in said sidewalls, endwalls and bottom wall.

8. A lidded container as defined in claim 1, further comprising buoyant means mounted exteriorly of said sidewalls and said endwalls to allow said container to float.

9. A lidded container as defined in claim 8, wherein said container includes on each sidewall and on each endwall thereof a downwardly depending skirt; said buoyant means being fixedly secured between said skirt and said sidewalls and endwalls.

* * * * *